(12) United States Patent
Kothapally et al.

(10) Patent No.: US 12,625,857 B1
(45) Date of Patent: May 12, 2026

(54) CONFLICT-FREE WRITE OPERATIONS IN MULTI-MASTER DATABASE

(71) Applicant: International Business Machines Corporation, Armonk, NY (US)

(72) Inventors: Madhu Pavan Kothapally, Warangal (IN); Narinder Kaur, Ludhiana (IN); Shivi Kashyap, Hyderabad (IN); Meer Nasser Ali, Hyderabad (IN); Manoj Kaila, Pedana (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/991,959

(22) Filed: Dec. 23, 2024

(51) Int. Cl.
　　*G06F 16/27*　　(2019.01)
　　*G06F 16/21*　　(2019.01)
　　*G06F 16/23*　　(2019.01)

(52) U.S. Cl.
　　CPC ........ *G06F 16/2343* (2019.01); *G06F 16/213* (2019.01); *G06F 16/27* (2019.01)

(58) Field of Classification Search
　　CPC ..... G06F 16/2343; G06F 16/27; G06F 16/213
　　See application file for complete search history.

(56) References Cited

U.S. PATENT DOCUMENTS

| | | | |
|---|---|---|---|
| 7,899,998 B1 | 3/2011 | Katzer et al. | |
| 10,198,492 B1 * | 2/2019 | O'Neill | .................. G06F 16/27 |

| | | | |
|---|---|---|---|
| 2010/0106744 A1 | 4/2010 | Wang | |
| 2015/0006483 A1 | 1/2015 | Goetsch | |
| 2016/0019252 A1 * | 1/2016 | Ducott, III | ......... G06F 16/2329 |
| | | | 707/634 |
| 2019/0155937 A1 * | 5/2019 | Barve | ................. G06F 16/2365 |
| 2019/0340166 A1 | 11/2019 | Raman et al. | |
| 2019/0340168 A1 | 11/2019 | Raman et al. | |
| 2021/0117444 A1 * | 4/2021 | Wilczynski | ......... G06F 11/3409 |
| 2023/0081900 A1 * | 3/2023 | Werner | .............. G06F 16/2379 |
| | | | 707/703 |
| 2025/0181423 A1 * | 6/2025 | Bhola | ..................... G06F 16/27 |

FOREIGN PATENT DOCUMENTS

| | | |
|---|---|---|
| WO | 2020/119050 A1 | 6/2020 |
| WO | 2024/164724 A1 | 8/2024 |

* cited by examiner

*Primary Examiner* — Khanh B Pham

(74) *Attorney, Agent, or Firm* — CANTOR COLBURN LLP; Stephen Yoder

(57) ABSTRACT

A method for operating a multi-master database includes defining a database cluster having a plurality of databases. Each database is assigned to a corresponding geographic region. Read/write requests originating from a user are assigned to a database with the same corresponding geographic region as the user. The database cluster defines a schema including defined relationships between data records stored in the database cluster such that each data record stored in the database cluster is within a data cluster. Each data cluster includes a single parent data record replicated in each database of the database cluster. Each data cluster defines a single master database of the plurality of databases. The single master database is the database originating the single parent data record.

18 Claims, 8 Drawing Sheets

600

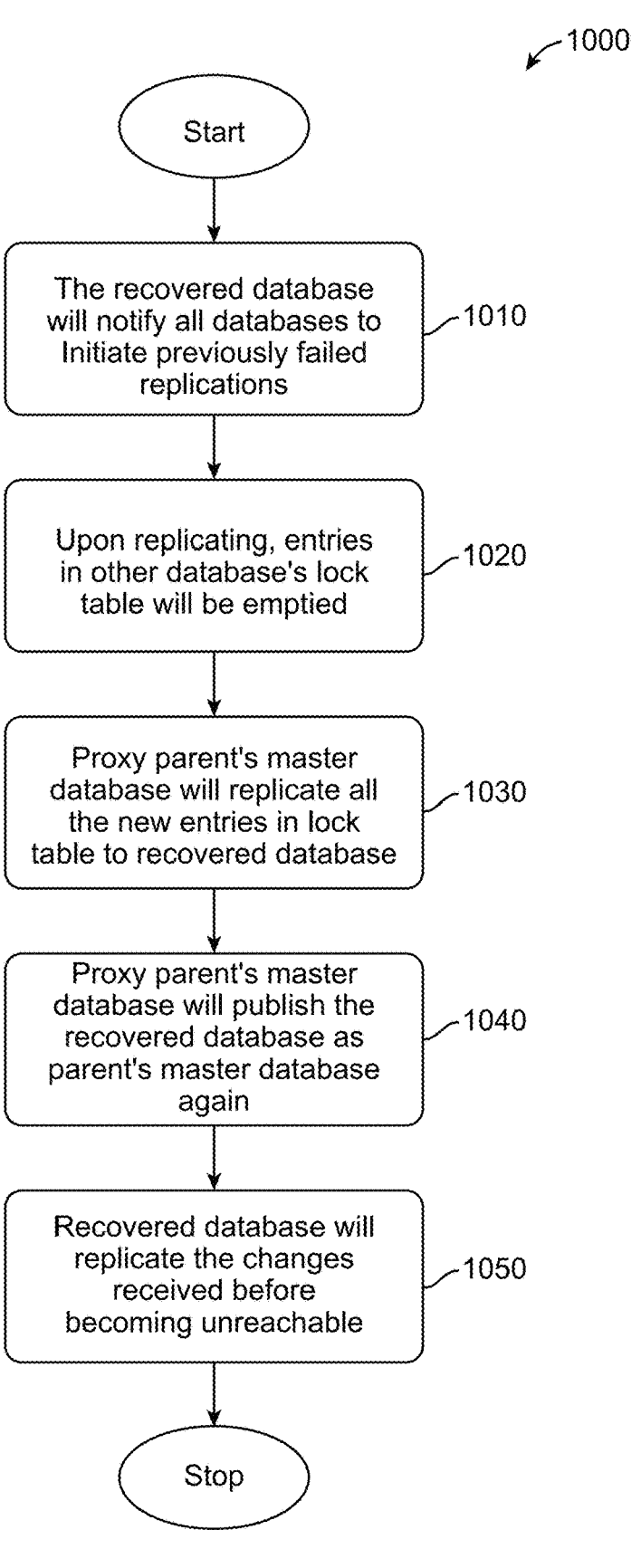

1000

Start

The recovered database will notify all databases to Initiate previously failed replications —1010

Upon replicating, entries in other database's lock table will be emptied —1020

Proxy parent's master database will replicate all the new entries in lock table to recovered database —1030

Proxy parent's master database will publish the recovered database as parent's master database again —1040

Recovered database will replicate the changes received before becoming unreachable —1050

Stop

FIG. 8

CONFLICT-FREE WRITE OPERATIONS IN MULTI-MASTER DATABASE

BACKGROUND

The present invention generally relates to database structures, and more specifically, to database structures and operation schema for allowing conflict-free write operations in multi-master databases.

Database structures using multiple redundant databases, such as those utilized for cloud computing, include multiple redundant databases. When two operations simultaneously write different values to the same entries of redundant databases or when one or more of the redundant databases is not updated to reflect a correctly performed write operation, the entries in corresponding databases will be different. This is referred to as a conflict, and database conflicts can cause cascading errors within a database structure.

SUMMARY

Embodiments of the present invention are directed to a computer-implemented method for providing a database schema. A non-limiting example of the computer-implemented method includes a method for operating a multi-master database includes defining a database cluster having a plurality of databases. Each database is assigned to a corresponding geographic region. Read/write requests originating from a user are assigned to a database with the same corresponding geographic region as the user. The database cluster defines a schema including defined relationships between data records stored in the database cluster such that each data record stored in the database cluster is within a data cluster. Each data cluster includes a single parent data record replicated in each database of the database cluster. Each data cluster defines a single master database of the plurality of databases. The single master database is the database originating the single parent data record.

Embodiments of the present invention are further directed to a computer system and a computer program product for implementing and distributing the computer-implemented method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 8 illustrates a failover process for selecting a proxy master database when a database becomes unreachable, ensuring continued operation and data integrity.

Figure 1:
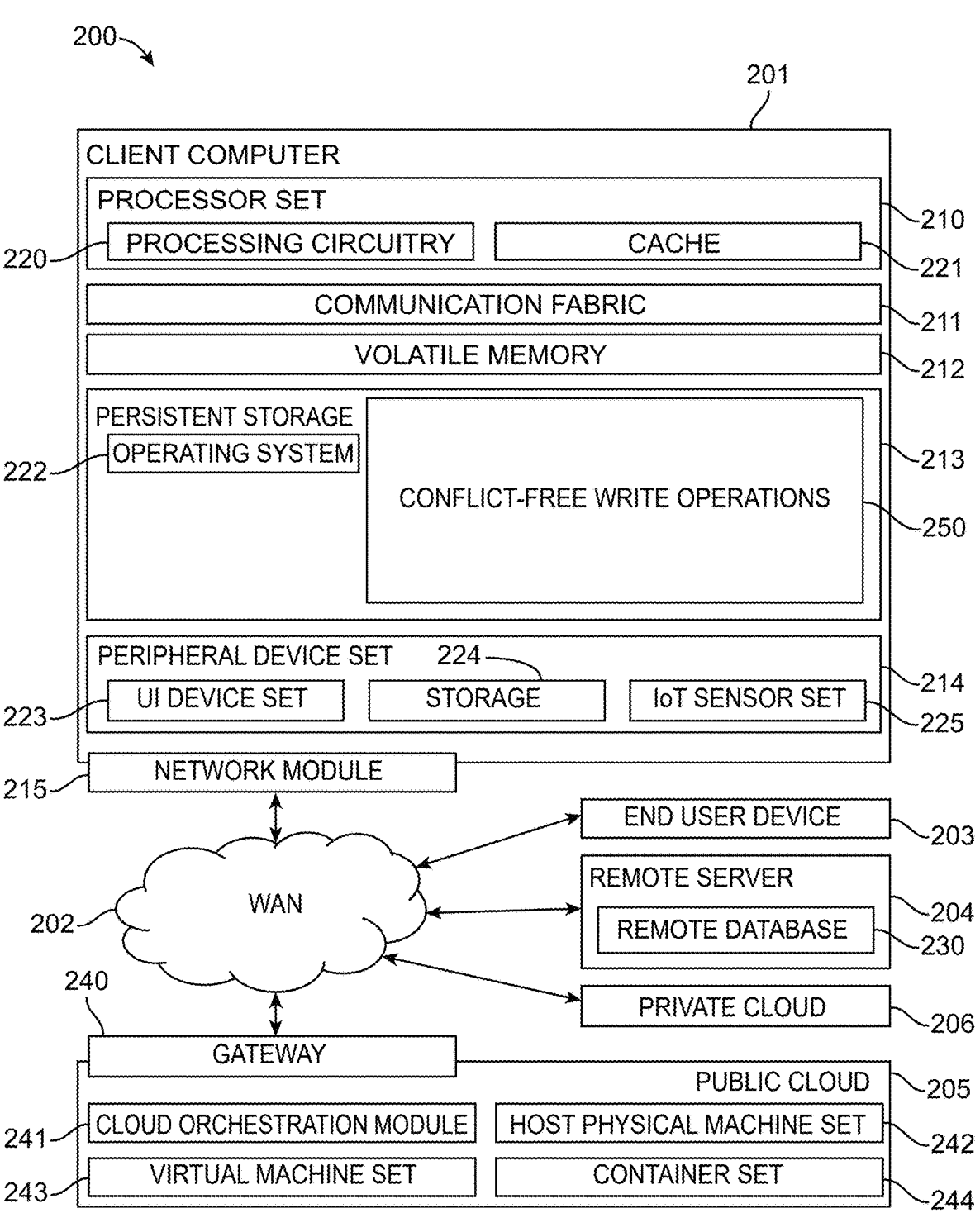
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

FIG. 1 illustrates Computing environment 200 which contains an example of an environment for the execution of at least some of the computer code involved in performing the inventive methods, such as performing conflict-free write operations at block 250. In addition to block 250, computing environment 200 includes, for example, computer 201, wide area network (WAN) 202, end user device (EUD) 203, remote server 204, public Cloud 205, and private Cloud 206. In this embodiment, computer 201 includes processor set 210 (including processing circuitry 220 and cache 221), communication fabric 211, volatile memory 212, persistent storage 213 (including operating system 222 and block 120, as identified above), peripheral device set 214 (including user interface (UI), device set 223, storage 224, and Internet of Things (IoT) sensor set 225), and network module 215. Remote server 204 includes remote database 232. Public Cloud 205 includes gateway 230, Cloud orchestration module 231, host physical machine set 232, virtual machine set 243, and container set 244.

COMPUTER 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 232. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a Cloud, even though it is not shown in a Cloud in FIG. 3. On the other hand, computer 201 is not required to be in a Cloud except to any extent as may be affirmatively indicated.

PROCESSOR SET 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in block 250 in persistent storage 213.

COMMUNICATION FABRIC 211 is the signal conduction paths that allow the various components of computer 201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 212 is any type of volatile memory now known or to be developed in the future. Examples include dynamic type random access memory (RAM) or static type RAM. Typically, the volatile memory is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

PERSISTENT STORAGE 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface type operating systems that employ a kernel. The code included in block 250 typically includes at least some of the computer code involved in performing the inventive methods.

PERIPHERAL DEVICE SET 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

NETWORK MODULE 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215.

WAN 202 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

REMOTE SERVER 204 is any computer system that serves at least some data and/or functionality to computer 201. Remote server 204 may be controlled and used by the same entity that operates computer 201. Remote server 204 represents the machine(s) that collects and store helpful and useful data for use by other computers, such as computer 201. For example, in a hypothetical case where computer 201 is designed and programmed to provide a recommendation based on historical data, then this historical data may be provided to computer 201 from remote database 232 of remote server 204.

PUBLIC CLOUD 205 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 205 is performed by the computer hardware and/or software of Cloud orchestration module 241. The computing resources provided by public Cloud 205 are typically implemented by virtual computing environments that run on various computers making up the computers of host physical machine set 242, which is the universe of physical computers in and/or available to public Cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public Cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 205, except that the computing resources are only available for use by a single enterprise. While private Cloud 206 is depicted as being in communication with WAN 202, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 205 and private Cloud 206 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Turning now to an overview of technologies that are more specifically relevant to aspects of the invention, multi-master database setups include multiple nodes for serving write requests in a multi-node database configuration for high throughput. When a master node accepts the write request, the master node processes the write request and replicates the changes in the background to other nodes of the database cluster using various replication strategies.

In existing systems, cloud-native applications follow a microservices architecture where individual service is loosely coupled to perform a set of activities for large-scale applications. Ideally, every independent service is provided its own database. For many business requirements database with high availability is chosen. Availability and partition tolerance are prioritized over consistency when selecting which database is assigned to a particular application and this choice results in preferring a multi-master database architecture over a master-slave database architecture. Partition tolerance means that the database cluster must continue to work despite any number of communication breakdowns between nodes (individual databases) in the database cluster.

Multi-master database architectures have their own challenges for tackling conflicts that may arise. Among those challenges is a first challenge when there is a network failure between two nodes. When this occurs data sync is delayed and there is a possibility that someone has updated the same document at another database node, generating a conflict.

Also among the challenges is a second scenario where conflict can happen when the same data record is being edited by multiple users in different database nodes concurrently. In the second scenario, when data replication starts, the data replication finds the same document with duplicate revisions from different nodes, generating a conflict.

Turning now to an overview of aspects of the invention, one or more embodiments of the invention address the above-described shortcomings of the prior art by providing a conflict avoidance algorithm to prevent conflicts between concurrent database operations. Conflicts can arise when multiple users or applications attempt to modify the same data simultaneously. This can lead to data loss or corruption. The disclosed system avoids database conflicts using a novel approach of clustering data records with respect to user's operations and performing the write operations of these clusters at the master database for the given cluster of records.

Existing systems do not localize data operations to a nearest originating region, and do not guarantee conflict avoidance on database failover and recovery process. Existing systems also do not define a mechanism to perform the update operation without changing the ownership of the data record.

Figure 2:
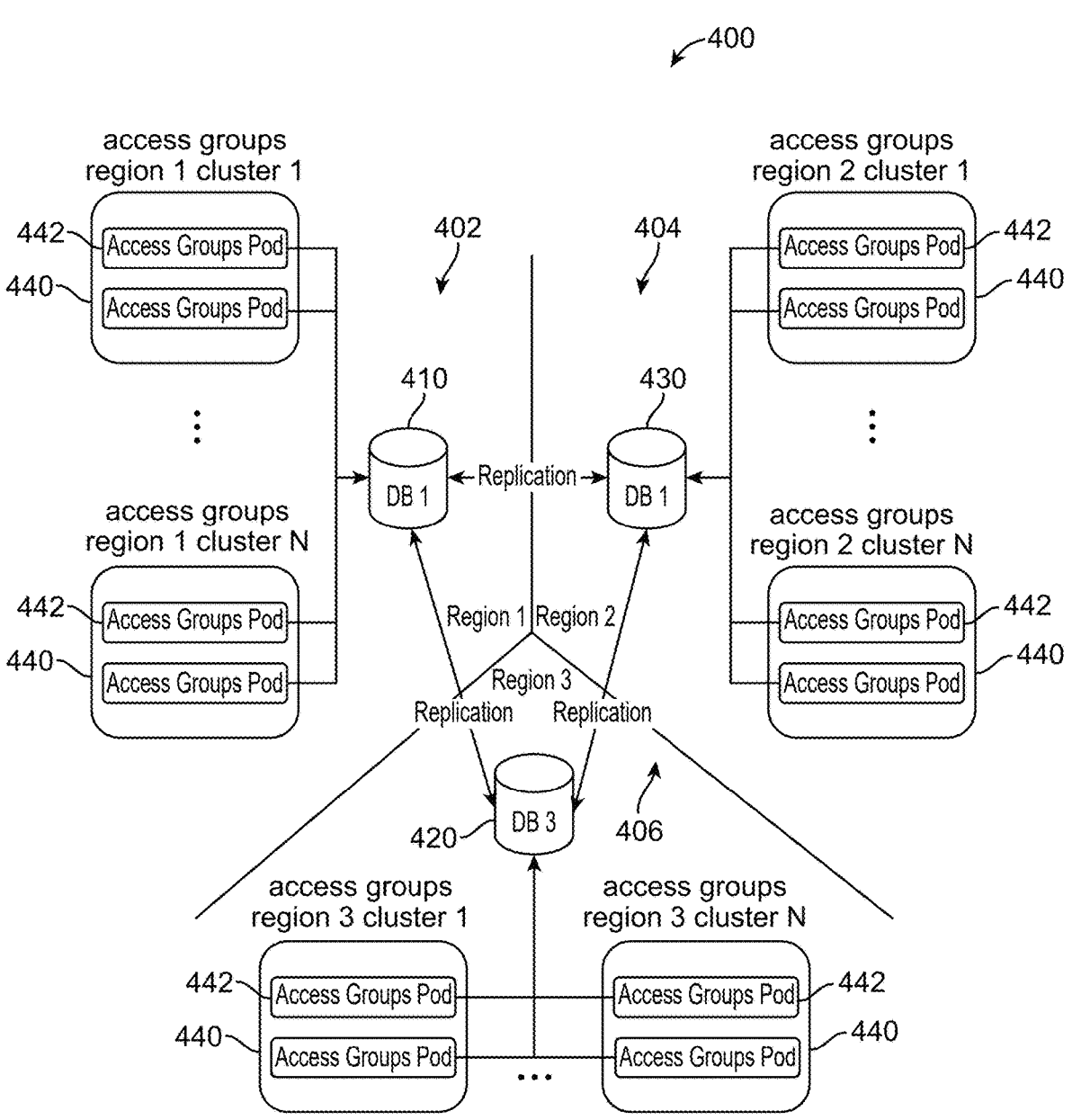
FIG. 2 illustrates a computing environment for executing computer code involved in performing conflict-free write operations, detailing components such as computers, networks, and storage.

In one example, the distributed database system described herein includes the components depicted in FIG. 2. In the example system 400, databases 410, 420, 430 are configured separated into geographic regions 402, 404, 406. Each database 410, 420, 430 is physically located in the geographic region 402, 404, 406 to which it is assigned. Within each region 402, 404, 406 are multiple access groups 440 that are separated into N clusters. Each access group 440 includes multiple access group pods 442, and each access group pod 442 defines applications and users that access the database system 400. Each cluster is generally configured to access the database 410, 420, 430 of the corresponding region. This configuration results in users and applications located in a region 402, 404, 406 interacting with, and performing read and write operations on the database 410, 420, 430 located in the same region 402, 404, 406.

In practical examples, additional databases 410, 420, 430 and regions 402, 404, 406 can exist beyond three and the disclosure contained herein can be logically extended by one of skill in the art to any number of databases in excess of two.

In one example, the operations of the database system 400 are defined by a schema. The schema defines a relationship between different types of data within the databases 410, 420, 430, with one of the databases 410, 420, 430 being defined as the master database for any given data entry cluster. As used herein a data entry cluster refers to a set of data records including a parent entry and one or more child entries corresponding to the parent entry. In one example, a data entry cluster includes a template document as the parent entry, and revisions to the template document as child entries.

Each database 410, 420, 430 identifies the master database in the database cluster with respect to the write operation on the given data entry cluster. Each database only performs write operations on a given data entry cluster upon receiving approval to preform the write operations from the master database of the data entry cluster on which the write operation is being performed. By requiring approval of the master database and using the processes described herein, the write operations in the database are conflict-free.

Figure 3:
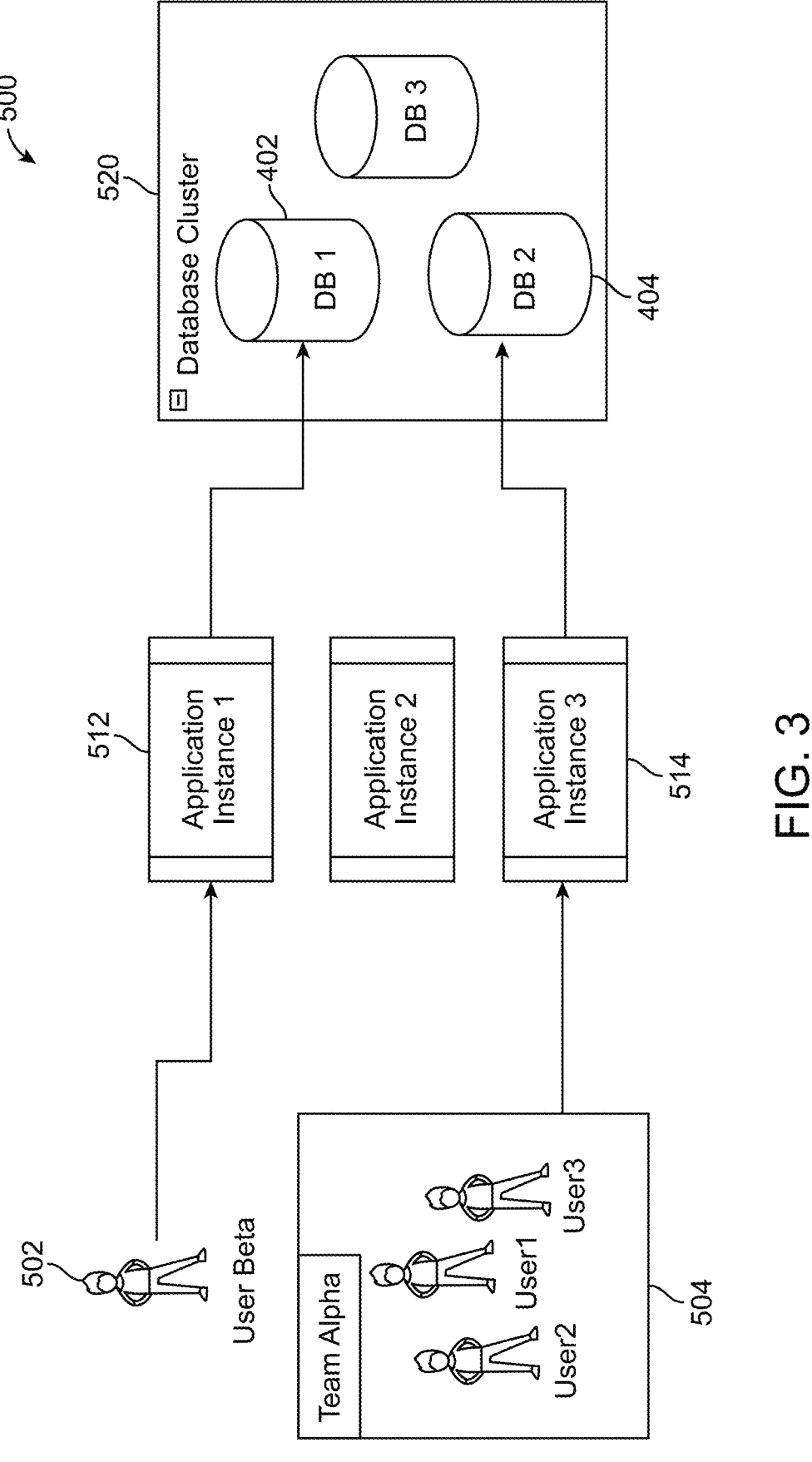
FIG. 3 illustrates a distributed database system with databases configured in separate geographic regions, each containing multiple access groups and clusters for conflict-free operations.
Figure 4:
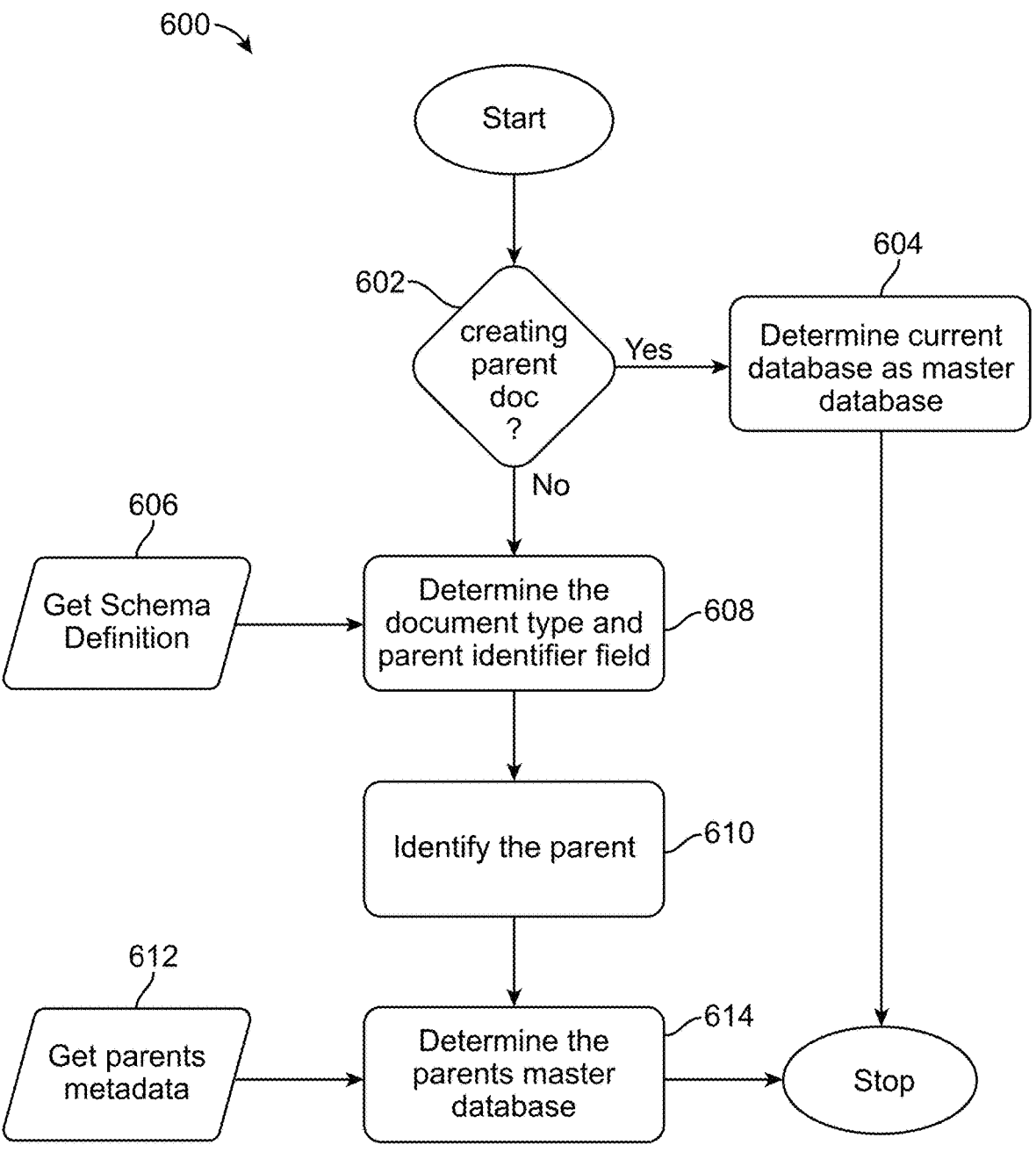
FIG. 4 illustrates an example usage flow of the system, showing how user requests are routed to databases based on geographic regions and how master databases are determined.

With continued reference to FIG. 2, FIG. 3 illustrates an example usage flow 500 of the system 400, with a first user 502 in a first region 402 and a second set of users 504 in a second region 404. The first user 502 uses a first instance of an application 512 to request changes in the database cluster 520. As the first user is in the first region 402, the first user's requests are routed to the database 410 that is located in the first region 402. Similarly, the second set of users 504 are located in the second region 404 and are using a second instance of the application 514. As the second set of users 504 is in the second region 404, the second set of user's requests are routed to the database 420 that is located in the second region 404.

As a result of this example usage flow 500, the majority of the changes will be originating in the second region 404 and the second database 420 is set as the master database for entries corresponding to the illustrated example flow 500. In one example, the schema assumes that a data entry cluster will originate from a user in the set of users 504 within the region 404 having the most users, and the corresponding database 420 is set as the master database. In another example, the user 502, 504 originating the data entry cluster may manually define the region 402, 404, 406 where the majority of users reside, and the corresponding database 410, 420, 430 is assigned as the master.

Within each data entry cluster in the database cluster 520 each data record is classified as either a 'parent record or a child' record. For a write operation to be performed on a given record, the following constraints are considered: A parent record can be created in any of the databases 410, 420, 430 in a database cluster 520. The parent record is created in the database 410, 420, 430 in the same geographic region 402, 404, 406 as the request originating the database entry. As a result, the parent record is geographically close to the originating request location.

The database 410, 420, 430 containing the parent record becomes the master database for the parent record. Child records are created and updated in any of the databases 410,

420, 430 only when the parent record's master database provides permission for the child record's database to perform the write operation. Child records can be updated only when the corresponding master database (e.g. the database 410, 420, 430 in which the corresponding parent record is stored) has given permission to perform the write operation. These constraints ensure that the write operations performed result in conflict-free writes. The constraints also increase the performance of the overall system 400 as the master database for any given record is determined during creation of the parent record and, in the majority of requests, the data in the record is operated on with requests originating in from the region it is created.

Implementations of the system 400 can include large-scale distributed systems where the application is available in multiple regions 402, 404, 406. An application typically stores the data records in a database 410, 420, 430 and the records are replicated among the various nodes (databases 410, 420, 430) in the database cluster 520. Usually, the data records used by the application are correlated to each other. The system 400 defines a schema that controls the relationship between data records across the distinct databases 410, 420, 430. This schema reduces cross-region access and increases the performance of the database cluster 520. The objective of the schema definition is to make sure that the data a user is going to manage is correlated in the described parent-child relationship. This relationship creates clear boundaries for the data with respect to different users. Table 1 represents the parent/child relationship of data elements. It should be appreciated that the relationships are represented in table format for ease of explanation and understanding, and a practical implementation would not necessarily utilize a stored table to define the parent/child relationships of data elements.

TABLE 1

| Schema Definition | | |
| --- | --- | --- |
| Type | Parent/Child | Parent Identifier Field |
| templateDoc | Parent | NA |
| templateVersionDoc | Child | templateId |

In Table 1, the application is considered to generate three types of data records. All three types of data records are correlated to each other in parent-child relationships. In one example, the functionality of the application may be maintaining the templates and assigning the templates to accounts. Users can create a template with one or many template versions and assign each template version to accounts. In the given example the 'templateDoc' type data is the parent data element, as the 'template VersionDoc' and 'template AssignmentDoc' (child documents) cannot be created without the template document. Once the parent data element is created the child documents can be created. Within each child document, the parent document is referenced as indicated in the 'Parent Identifier Field' column of the schema definition table.

The application clusters document types together with one parent and multiple child documents. Within a document cluster, all the write operations are performed on the database 410, 420, 430 where the parent document was created. In this schema, a child document exists only when the parent document exists. The application defines document clusters based on each user's utilization of the application. As such, only one user will be operating on the document cluster.

An application can have multiple parent/child data record types. The appropriate relationship is defined for each set of records, as the parent/child relationships impact the performance of the database cluster 520. By way of example, 100 create operations of child document type are performed out of which 90 write operations are received to the region 402, 404, 406 where the parent data record was created. The system considers the child document's master database based on the parent's master database, and the 90 write operations are concluded in the same database 410, 420, 430 without the need to reach another database to assess requirements (e.g., without the need to request write permission from a parent database). The other 10 operations are required to request write permission from the parent's master database 410, 420, 430. As these documents are already clustered, the create operations are still considering the parent's master database as their master database.

With continued reference to FIGS. 1-3, FIG. 4 illustrates a process 600 for performing a write operation. The process 600 is performed when the parent's master database is given permission to perform a write operation. Initially the process determines parent's master database, identifying the document based on the type of the document, consulting the schema definition to determine the parent identifier field, fetching the parent identifier to determine the parent's master database, and determining if the document type is a parent type at a creating parent document check 602.

When the write operation is creating a parent document, the process 600 determines that the current database is the master database at step 604, and the process 600 is completed.

When the write operation is not creating a parent document, the process 600 determines the document type and a parent identifier field of the document by consulting a schema definition 606 at step 608. The parent document is then identified at step 610 and the master database of the parent is identified by consulting the parent document's metadata 612 at step 614.

Each database 410, 420, 430 in the database cluster 520 includes a "lock table". The lock table includes information with respect to the document that is undergoing the write operation and defines whether the database 410, 420, 430 including the lock element is able to perform a write operation. While referred to herein as a 'lock table' in the interest of clarity of description, in a practical implementation the 'lock table' is a metadata storage element that stores metadata related to a single data record undergoing a write operation. When the document is replicated to all the databases in the cluster 520, the entry is removed. This helps maintain a minimal lock table. An entry in the lock table has two fields, the document identifier and the current revision being written. An entry in the lock table restricts write operations if the requested revision is not based on the current revision. A sample lock table for a database is illustrated in Table 2.

TABLE 2

| Lock Table for Database 1 | |
| --- | --- |
| Document Id | Revision |
| templateDoc-1234 | 6 |
| templateVersionDoc-1234 | 2 |

The lock table being accessible when the database is down is important to keep the system highly available. The lock table is stored in a shared space as the lock table needs to be accessible even when a given database 410, 420, 430 is unreachable. Alternatively, an air-gaped private network connection to the lock table can be utilized to keep the lock table safe from network outage risks.

Additionally, each database 410, 420, 430 in the database cluster 520 includes a wait table. While referred to herein as a 'wait table' in the interest of clarity of description, in a practical implementation the 'wait table' is a metadata storage element that stores metadata related to a single data record undergoing a write operation. The wait defines information with respect to any documents that are undergoing a write operation in databases other than the parent's master database. Each entry in the wait table persists until the document undergoing the write operation is replicated to the parent's master database in the cluster 520. Once the document is replicated to the parent's master database in the database cluster 520, the entry is removed in the wait table and the replication process is started using the parent's master database. This process maintains a minimal wait table size, while still ensuring that all database entries are properly controlled. An entry in the wait table has three fields, the document identifier, the current revision being written and the timestamp of the write operation. An example wait table for a database is shown in Table 3.

TABLE 3

| Wait Table for Database 1 | | | |
| --- | --- | --- | --- |
| Requested Database | Document Id | Revision | Timestamp |
| Database 2 | templateDoc-1234 | 6 | May 16, 2023 T13:07:06Z |
| Database 3 | templateVersionDoc-3423 | 2 | May 16, 2023 T13:07:39Z |

The wait table is accessible when the database is down in order to keep the system highly available. The wait table is stored in a shared space, allowing the wait table to be accessible even when the database is unreachable. In alternate examples, an air-gaped private network connection to the wait table can be utilized to keep the wait table safe from network outage risks.

Figure 5:
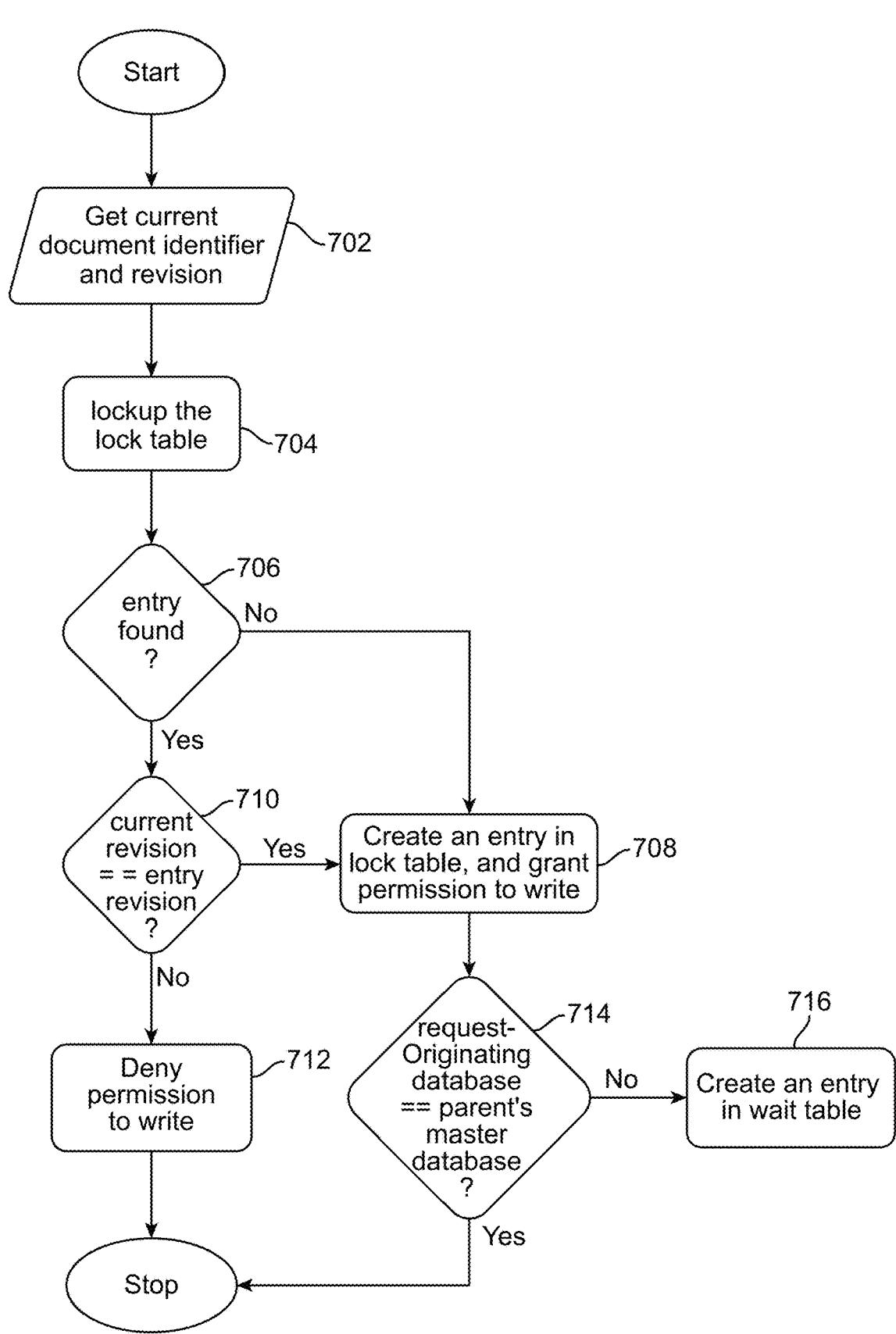
FIG. 5 illustrates a process for performing a write operation, detailing steps for determining the master database and handling parent and child records.
Figure 6:
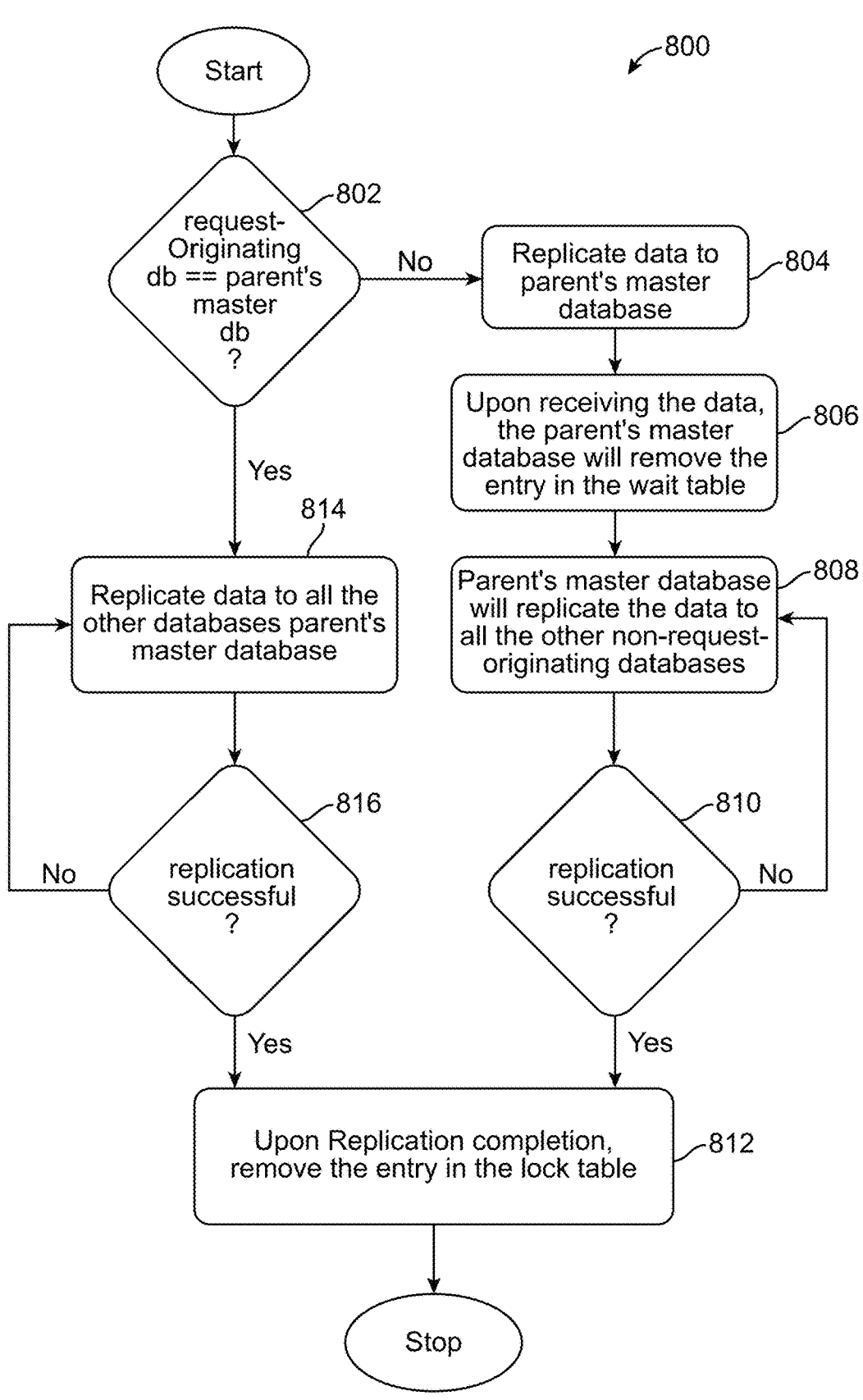
FIG. 6 illustrates a process for handling write requests, including authorization checks and lock table management to ensure conflict-free operations.
Figure 7:
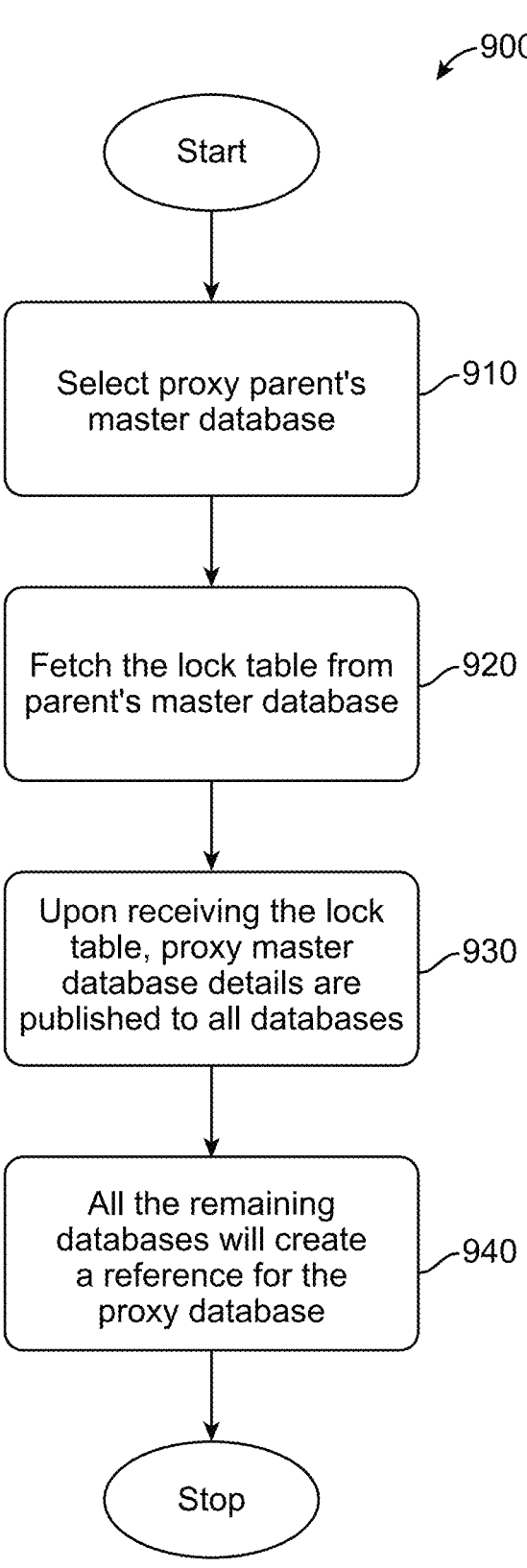
FIG. 7 illustrates a replication strategy for databases, showing how data is replicated across databases to maintain consistency and availability.

Upon receiving a write request, a database 410, 420, 430 determines if the database 410, 420, 430 is the parent's master database of the current data records according to a process 700 illustrated in FIG. 5. Initially the process 700 retrieves the current document identifier and revision at step 702 and locks the current version of the lock table in a step 704.

Once the parent's master database is identified an authorization request is sent to the master database. Upon receiving the request, the database consults the lock table (from the parent region) to find any matching entries at a check 70. If matching entries are not found, the master database responds to the authorization request with a grant and creates an entry in the lock table at step 708. This lock table entry includes the data record identifier and the current revision of the data record. If matching entries are found, the current revision number is checked, and the database determines if the current revision number is equal to the locked revision number at a check 710. If the revision numbers are equal, then the request is responded with a grant (write permission is granted) at step 708 and the current revision is updated in the lock table. If the revision numbers are not equal, then the request is returned with denial (write permission is not granted) at step 712.

Once the authorization is received and confirmed at a check 714, the request-originating database performs the write operation and an entry in the write table is created at step 716. The process 600 requests authorization to perform the write operation. This mechanism is useful in improving the performance as the database can perform the preoperational tasks like generating hash, compression, etc. while the parent's master database performs the authorization check.

With continued reference to FIGS. 1-5, FIG. 6 illustrates a process 800 defining a replication strategy for the databases. The objective of the replication strategy is to transfer data to all the databases 410, 420, 430 in a single replication action. Under the process 800, however, the request-originating database does not replicate the data to all the regions.

Initially the process checks to determine if the request originating database is the parent's master database at a check 802. When the request originating database is not the parent's master database, the process 800 replicates the data to only the parent's master database at a step 804. Upon receiving the data, the parent's master database removes the corresponding entry from the wait table in a step 806 and replicates the data to all other non-request originating databases in a step 808. the process 800 then checks to determine is the replication is successful at a check 810.

If the replication was not successful the process 800 returns to step 808, otherwise the process 800 proceeds to remove the corresponding entry from the lock table in the parent's master database in a step 812.

When the check 202 determines that the request originating database is the parent's master database, the process 800 replicates the data to all other databases in a step 814. The process 800 then checks to determine is the replication is successful at a check 816. If the replication was not successful, the process 800 returns to step 814 otherwise the process 800 proceeds to remove the corresponding entry from the lock table in the parent's master database in the step 812.

In some events, a fault may occur in the database cluster 520 resulting in one or more database 410, 420, 430 being unavailable. A failover process is a process of selecting a proxy parent's master database when a database is unreachable from one or many databases in the database cluster. With continued reference to FIGS. 1-6, FIG. 7 illustrates one example failover process 900.

A database is considered unreachable when a request-originating database is trying to get a grant from the parent's master database to perform a write operation, when such occurs, the failover process 900 engages. Initially, a proxy parent's master database is selected based on the workload on the databases in a step 910. The selected proxy parent's master database fetches the lock table from the parent's master database in a step 920. Upon receiving the lock table, the proxy parent's master database will publish that it is now going to act as a proxy parent's master database for the failover database in a step 930. All the databases now create a reference for the proxy database so that they can request write permission on the proxy database until the failover database is recovered in step 940.

As the proxy parent's master database does not have the changes for the entries mentioned in the lock table, it cannot replicate the changes. As a result, the entries in the lock table will persist. As one of the databases is unreachable all the replications can not be completed. This results in persisting the new entries in all the lock tables. This does not result in an operational impact as the available databases have the changes replicated, and the available databases maintain the latest revisions of modified documents.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for operating a multi-master database system comprising:

defining a database system having a plurality of databases, with each database being assigned to a corresponding geographic region, wherein read/write requests originating from a user are assigned to a database in the plurality of databases with the same corresponding geographic region as the user;

the database system defining having a defined schema, the defined schema including relationships between data records stored in the database system such that each data record stored in the database system is within a data cluster, each data cluster includes a single parent data record and a plurality of child data records, wherein each parent data record is replicated in each database of the database system, and each data cluster defines a single master database of the plurality of databases such that each data cluster in the database system defines a same database of the plurality of databases as the single master database and, wherein the single master database is the database of the plurality of databases originating the single parent data record;

replicating a write operation from a database of the plurality of databases to each other database of the plurality of databases by:

determining that the database of the plurality of databases in which the write operation is being replicated from is not a parent's master database of the data record being operated by the write operation;

replicating the write operation to the parent's master database of the data record being operated by the write operation; and replicating the write operation to each other database in the plurality of databases from the parent's master database of the data record being operated by the write operation.

2. The computer-implemented method of claim 1, wherein the single master database corresponding to each data cluster is the database of the plurality of databases assigned to the geographic region from which a write request creating the data cluster originates.

3. The computer-implemented method of claim 1, wherein a database of the plurality of databases responds to receiving a write request by determining the write request is not creating a parent data record, identifying a parent data record corresponding to the write request, determining a master database of the parent data record, and requesting write approval from the master database of the parent data record.

4. The computer-implemented method of claim 3, further comprising responding to write approval from the master database of the parent data record by writing a child data record in the data cluster of the parent data record.

5. The computer-implemented method of claim 4, further comprising replicating the data cluster including the child data record to each other database of the plurality of databases.

6. The computer-implemented method of claim 1, further comprising responding to a request for write approval from a database of the plurality of databases by comparing a revision number of the data record in the database for which write approval is requested of the data record for which write approval is requested and approving the write request when the revision number of the data record in the database for which write approval is requested is one less than a revision number of the data record in a parent's master database of the data record for which write approval is requested.

7. The computer-implemented method of claim 1, wherein the databases in the plurality of databases includes a lock table and the lock table defines the data record undergoing a write operation and defines whether the data record may be written.

8. The computer-implemented method of claim 7, wherein the lock table is accessible for the databases in the plurality of databases without requiring access to a correspond parent's master database.

9. A computer program product comprising:
computer executable instructions for causing a computer system to define a database architecture, the database architecture comprising:
a database system having a plurality of databases, with each database being assigned to a corresponding geographic region, wherein read/write requests originating from a user are assigned to a database in the plurality of databases with the same corresponding geographic region as the user;
the database system defining a schema including defined relationships between data records stored in the database such that each data record stored in the database system is within a data cluster, each data cluster includes a single parent data record, and each data cluster defines a single master database of the plurality of databases, wherein the single master database is the database of the plurality of databases storing the single parent data record; and
replicating a write operation from a database of the plurality of databases to each other database of the plurality of databases by:
determining that the database of the plurality of databases in which the write operation is being replicated from is not a parent's master database of the data record being operated by the write operation;
replicating the write operation to the parent's master database of the data record being operated by the write operation; and
replicating the write operation to each other database in the plurality of databases from the parent's master database of the data record being operated by the write operation.

10. The computer program product of claim 9, wherein the single master database corresponding to each data cluster is the database of the plurality of databases assigned to the geographic region from which a write request creating the data cluster originates.

11. The computer program product of claim 9, wherein a database of the plurality of databases responds to receiving a write request by determining the write request is not creating a parent data record, identifying a parent data record corresponding to the write request, determining a master database of the parent data record, and requesting write approval from the master database of the parent data record.

12. The computer program product of claim 11, further comprising responding to write approval from the master database of the parent data record by writing a child data record in the data cluster of the parent data record.

13. The computer program product of claim 12, further comprising replicating the child data record to each other database of the plurality of databases.

14. The computer program product of claim 9, further comprising responding to a request for write approval from a database of the plurality of databases by comparing a revision number of the data record in the database for which write approval is requested of the data record for which write approval is requested and approving the write request when the revision number of the data record in the database for which write approval is requested is one less than a revision number of the data record in a parent's master database of the data record for which write approval is requested.

15. The computer program product of claim 9, wherein the databases in the plurality of databases includes a lock table and the lock table defines the data record undergoing a write operation and defines whether the data record may be written.

16. The computer program product of claim 15, wherein the lock table is accessible for the databases in the plurality of databases without requiring access to a correspond parent's master database.

17. A computer system comprising:
a database system having a plurality of databases, with each database being assigned to a corresponding geographic region, wherein read/write requests originating from a user are assigned to a database in the plurality of databases with the same corresponding geographic region as the user;
the database system defining a schema including defined relationships between data records stored in the database such that each data record stored in the database system is within a data cluster, each data cluster includes a single parent data record, and each data cluster defines a single master database of the plurality of databases, wherein the single master database is the database of the plurality of databases storing the single parent data record; and
replicating a write operation from a database of the plurality of databases to each other database of the plurality of databases by:
determining that the database of the plurality of databases in which the write operation is being replicated from is not a parent's master database of the data record being operated by the write operation;
replicating the write operation to the parent's master database of the data record being operated by the write operation; and
replicating the write operation to each other database in the plurality of databases from the parent's master database of the data record being operated by the write operation.

18. The computer system of claim 17, wherein the single master database corresponding to each data cluster is the database of the plurality of databases assigned to the geographic region from which a write request creating the data cluster originates.

\* \* \* \* \*